United States Patent [19]

Miller et al.

[11] Patent Number: 5,446,653
[45] Date of Patent: Aug. 29, 1995

[54] RULE BASED DOCUMENT GENERATION SYSTEM

[75] Inventors: Kevin J. Miller, Longmeadow, Mass.; Richard L. Rowley, Glastonbury, Conn.

[73] Assignee: Aetna Casualty and Surety Company, Hartford, Conn.

[21] Appl. No.: 264,185

[22] Filed: Jun. 22, 1994

Related U.S. Application Data

[63] Continuation of Ser. No. 59,706, May 10, 1993, abandoned.

[51] Int. Cl.[6] ............................................. G06F 17/30
[52] U.S. Cl. ................................ 364/401; 364/419.19
[58] Field of Search .................... 364/401, 419.19, 408; 395/54, 60, 919, 921, 934

[56] References Cited

U.S. PATENT DOCUMENTS

| | | | |
|---|---|---|---|
| 4,766,539 | 8/1988 | Fox . | |
| 4,831,526 | 5/1989 | Luchs et al. . | |
| 4,975,840 | 12/1990 | DeTore et al. | 364/401 |
| 4,989,852 | 2/1991 | Gunther, Jr. | 364/471 |
| 5,006,998 | 4/1991 | Yasunobu et al. | 395/925 |
| 5,043,891 | 8/1991 | Goldstein et al. | 364/419.1 |
| 5,119,307 | 6/1992 | Blaha et al. | 395/919 |
| 5,148,366 | 9/1992 | Buchanan et al. . | |
| 5,191,522 | 3/1993 | Bosco et al. | 364/401 |

Primary Examiner—Donald E. McElheny, Jr.
Attorney, Agent, or Firm—Barry R. Lipsitz

[57] ABSTRACT

Documents are automatically generated by assembling a plurality of clauses selected from a library of clauses stored in a computer system. A rule set is assigned to each of the clauses. Each rule set provides at least one rule that must be satisfied in order to include the clause associated therewith in a document. After document parameters are entered into the computer system, each rule set is tested to identify those that are satisfied by the document parameters. The clauses to which the identified rule sets are assigned are retrieved and assembled into the document. The document generation system is particularly suitable for the creation of insurance policy documents. When necessary, insurance policy clauses are replaced with endorsement clauses based on endorsement selections made by a user. An endorsement selection list is generated by testing rule sets associated with the endorsements.

20 Claims, 7 Drawing Sheets

RULE BASED DOCUMENT GENERATION SYSTEM

This application is a continuation of commonly assigned, U.S. patent application Ser. No. 08/059,706 filed May 10, 1993, now abandoned.

BACKGROUND OF THE INVENTION

The present invention relates to a computerized system for automatically generating documents, and more particularly to a rule based system that assembles documents based on rule sets assigned to clauses of text. The present invention is particularly suitable for use in generating insurance policies.

Various computer assisted documentation systems are known in the art. For example, U.S. Pat. No. 5,148,366 to Buchanan, et al. discloses a document generation system for enhancing or replacing the dictation and transcription process. Standard ("boiler-plate") paragraphs are assembled by selecting the desired paragraphs from a checklist. The resultant document can be customized by inserting words into the document through the use of a word processor. The documents are not assembled by any type of rule checking process, and it is possible to end up with a document having conflicting or inconsistent paragraphs.

U.S. Pat. No. 4,831,526 to Luchs, et al. relates to a computerized insurance premium quote request and policy issuance system that prepares and writes insurance contracts. Entered or stored data is merged with predetermined text data to compile data for a final insurance document. The compiled data is then communicated to a printer for printing the insurance document. This system is not a rule based system, and requires an ongoing dialog with a user (e.g., insurance agent or underwriter) to create an insurance policy.

U.S. Pat. No. 4,766,539 to Fox discloses a system for writing a policy insuring against the occurrence of a specified weather condition. The system computes a premium based on various parameters, and provides a policy by filling in blanks on a preprinted insurance policy form. A printer is provided for filling in the blank spaces provided on the preprinted form, including the name of the party which is to own the policy, the amount of the insurance, the weather condition insured against, the location or locations of interest, the time period of interest, the amount of the premium and other such information. The completed form is then available for submission to the party which is to own the policy.

The generation of an insurance policy that does not rely on a preprinted form is a complicated task. In the past, insurance policies have been assembled from a standard, preprinted "core policy" that is modified by "endorsements" attached thereto. The endorsements are separate printed sheets that add, delete, or provide substitutes for specific policy provisions. This industry practice results in a policy that can be difficult to follow and understand.

The generation of an insurance contract is further complicated by various state laws that require different language for essentially the same coverage in different states. Certain states have other requirements that result in the addition of special clauses to the insurance policy. Prior to issuing a policy, it is critical to verify that the specific requirements of applicable state laws and regulations have been complied with in all respects. The collation of the proper endorsement pages with a core policy and verification for compliance with the relevant state laws is a complicated and time consuming process.

It would be advantageous to provide a rule based computer system for generating insurance policy contracts. Such a system would use rules to test each potential policy clause against the coverages desired to determine which clauses are required and valid for the insurance coverage requested by a proposed insured. It would be further advantageous for such a system to provide a complete contract, without the need for separate endorsement pages that modify clauses on other pages of the document. Such a policy would be complete from start to finish, with all clauses in the proper order and containing the proper language to meet appropriate state requirements. It would be still further advantageous to enable the generation of complete and correct insurance policies from an input file created by a system user. The system should enable a user to merely enter the coverages desired into a computer, and should then prompt the user for any additional information necessary (such as endorsements desired) based on the initial coverages indicated. After generating a complete policy based on the requested coverages and endorsements, it would be advantageous for the system to format and print the policy for issuance by an insurance company.

The present invention provides a rule based document generation system having the aforementioned advantages.

SUMMARY OF THE INVENTION

In accordance with the present invention, a rule based document generation system is provided for constructing insurance policies in response to coverage information input by a user. The system includes a computer system and memory means associated with the computer system for storing a library of insurance policy clauses and a rule set for each clause. Means are provided for entering coverage information to the computer system identifying at least one coverage to be provided in an insurance policy. Means are provided for processing the rule sets in the computer system to identify those that are satisfied by the entered coverage information. Means responsive to the processing means retrieve the clauses associated with the identified rule sets from memory. The retrieved clauses are then assembled into an insurance policy.

The apparatus can further comprise a printer coupled to the computer system for printing the insurance policy. The printer portion of the computer system can comprise a separate computer remote from the computer that processes the rule sets. In such an embodiment, the memory means can comprise a first memory for storing the rule sets and a second memory for storing the actual insurance policy clauses. The means for entering coverage information and means for processing the rule sets comprise a first computer of the computer system coupled to the first memory for providing a list of the insurance policy clauses that correspond to the identified rule sets. The retrieving means comprise a second computer of the computer system coupled to the second memory for retrieving the clauses set forth on said list and formatting them for printing.

The rule sets can each comprise, for example, at least one character identifying either a rule or a coverage and at least one operator to be applied to the character. In this manner, individual clauses can be associated with a specific coverage or group of coverages, and the clause will be selected only if the coverage(s) selected require that clause.

In another embodiment, a rule based document generation system is provided for constructing insurance policies in response to coverage information input to the system. A computer system is associated with memory means that store (i) a library of insurance policy clauses, (ii) a rule set for each insurance policy clause, (iii) a library of endorsements (i.e., modifiers), and (iv) a rule set for each endorsement. Means are provided for entering coverage information to the computer system identifying at least one coverage to be provided in an insurance policy. The computer system includes first means for processing the rule sets associated with the insurance policy clauses to identify and provide a list of the insurance policy clauses whose rule sets are satisfied by the entered coverage information. Second means process the rule sets associated with the endorsements to identify and provide a list of the endorsements whose rule sets are satisfied by the insurance policy clauses identified by the first processing means. The endorsements on the list are selectable by a user to provide endorsement clauses for modifying insurance policy clauses identified by the first processing means. Means are provided for revising the list of insurance policy clauses with data identifying endorsement clauses corresponding to endorsements selected from the list of endorsements. The insurance policy clauses and the endorsement clauses identified by the revised list are assembled into the insurance policy.

In the foregoing embodiment, the first processing means can comprise means for tentatively identifying a clause associated with a rule set that is satisfied by the entered coverage information. Means responsive to the entered coverage information determine whether the tentatively identified clause is valid for use in the insurance policy. Means responsive to the determining means identify a substitute clause instead of the tentatively identified clause in the event that the tentatively identified clause is invalid for use in the insurance policy. For example, a tentatively identified clause may not be valid for use in a particular state. In this instance, the entered coverage information (which includes the policy owner's state) is used to determine that a substitute clause must be provided instead of the tentatively identified clause in order for the policy to be valid in the policy holder's state.

Insurance policy clauses may become obsolete over time. It is desired to maintain a history of such clauses, so that an insurance company will always have a record of what clauses it has used in its policies at any given time. Such a history will also enable the insurance company to recreate a policy from a prior time period if necessary for claims coverage or legal proceedings. In order to accomplish this, the present invention provides an alias file for cross-referencing obsolete insurance policy clauses to corresponding replacement clauses. The second processing means examine the alias file and identify endorsements whose rule sets are satisfied by obsolete insurance policy clauses that have been replaced by replacement clauses identified by the first processing means.

The present invention further provides means for formatting an insurance policy for printing after retrieving the insurance policy clauses and endorsement clauses identified by the revised list. The formatting means are responsive to header information appended to the retrieved insurance policy and endorsement clauses.

The system can also provide null clauses in the library of insurance policy clauses. The null clauses each have a corresponding rule set, and provide space into which endorsements can subsequently be inserted. The null clauses can also be used to replace insurance policy clauses, resulting in the deletion of the insurance policy clause. Any null clauses that are not used are deleted prior to printing the insurance policy.

The memory means can comprise a first memory for storing the rule sets and a second memory for storing the insurance policy clauses and endorsement clauses. In such an embodiment, the means for entering coverage information, together with the first and second means for processing the rule sets and the revising means can all comprise a first computer of said computer system coupled to the first memory for providing the lists of clauses and endorsements. The assembling means comprise a second computer of the computer system coupled to the second memory.

A method is provided for automatically generating documents by assembling a plurality of clauses selected from a library of clauses stored in a computer system. Any type of document, including insurance policy documents, can be generated in accordance with the inventive method. The method comprises the steps of inputting the library of clauses into the computer system. A rule set is assigned to each of the clauses. Each rule set provides at least one rule that must be satisfied in order to include the clause associated therewith in a document. The rule sets are input to the computer system. Document parameters (e.g., desired insurance coverages and a policy holder's state of residence) are input into the computer system. Each rule set is tested in the computer to identify those that are satisfied by the document parameters. The clauses to which the identified rule sets are assigned are retrieved and assembled into the document.

A history of obsolete clauses can be maintained in the computer system by the steps of assigning a new rule set to each obsolete clause to prevent the identification of the obsolete clause during the testing step. A replacement clause is input to the computer for each obsolete clause that is to be replaced. A rule set is provided for each replacement clause and an alias file is provided that cross-references the obsolete clauses to corresponding replacement clauses.

In a specific embodiment of the inventive method, the document is an insurance policy and the clauses comprise insurance policy clauses. In such an embodiment, the method comprises the further steps of inputting a library of endorsements into the computer system. After the clauses satisfied by the document parameters have been identified, the endorsements which can be used to modify the identified clauses are detected. Endorsements that are desired for the insurance policy are selected from the detected endorsements. The selected endorsements are retrieved from memory instead of the corresponding insurance policy clauses modified thereby. The remaining insurance policy clauses are also retrieved and assembled together with the retrieved endorsement clauses into the insurance policy.

In a more specific embodiment, the clauses to which the identified rule sets are assigned are tested to determine whether the clause is valid for use in the insurance policy. A substitute clause is identified for retrieval instead of the identified clause in the event that the identified clause is invalid for use in the insurance policy.

Obsolete insurance policy clauses are cross-referenced to replacement clauses to obviate the need to amend endorsement rule sets each time a replacement clause is added. When an endorsement rule set identifies an obsolete insurance policy clause, the cross-reference list (alias file) enables the most current replacement clause to be located.

DESCRIPTION OF THE PREFERRED EMBODIMENT

The present invention provides a rule based document generation system. Although the invention is described herein in connection with the generation of insurance policy documents, it is noted that the invention is also useful in the generation of other types of documents, such as business contracts, technical documents, prospectuses, wills, and any other documents that can be assembled from a plurality of standard clauses.

In the illustrated embodiment, insurance policies are built from a software library of coverage provisions that can be rearranged and used in any number of ways according to the needs and coverage preferences of a proposed insured. A policy built by the system is printed as a complete, final document that does not require separate endorsement pages to be added to delete, replace or supplement core policy provisions. By enabling the quick and efficient generation of customized policies, coverage options are increased and a diverse range of policy holders can be accommodated.

Figure 1:
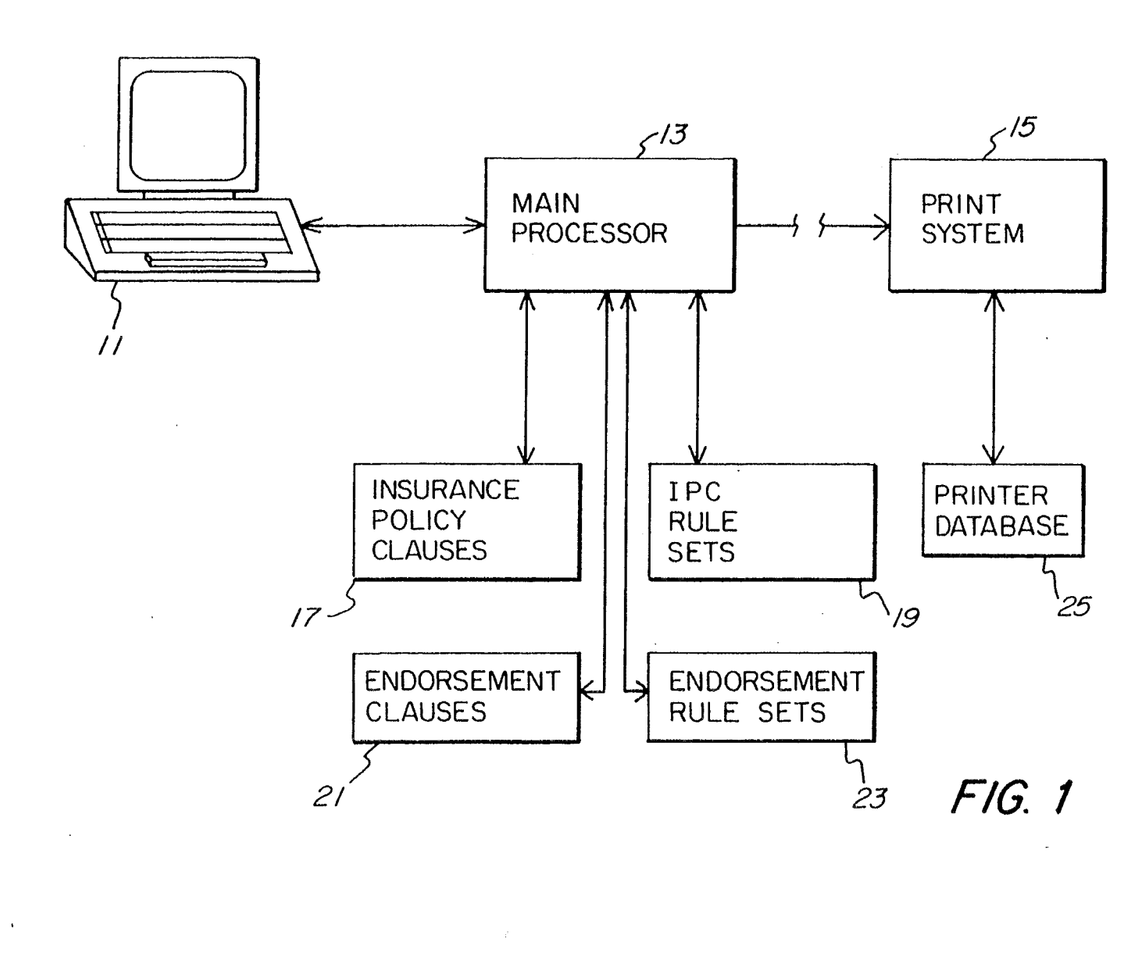
FIG. 1 is a block diagram showing the main components of a computer system in accordance with the present invention.

FIG. 1 illustrates the main components of a system in accordance with the present invention. A main processor 13, such as a mainframe computer, interfaces with a user through a terminal 11. Processor 13 is coupled to conventional memory (e.g., magnetic disk storage) that stores a library of standard insurance policy clauses 17 together with insurance policy rule sets 19. In accordance with the present invention, each insurance policy clause has a rule set assigned thereto for use in determining which clauses should be included in a given insurance policy. The processor memory also stores a library of endorsement clauses 21 (sometimes referred to herein as "modifiers") and endorsement rule sets 23. Each endorsement clause has a corresponding endorsement rule set assigned thereto, for use in providing a list of endorsements that can be selected by a user for an insurance policy being built. Unlike prior insurance policies, wherein endorsements are provided as separate pages that modify clauses contained in the printed policy, the endorsement clauses in the present invention are printed instead of the corresponding insurance policy clauses.

Printing of the final policy is provided by a print system 15 coupled to main processor 13. Print system 15 may be remote from the main processor, in which case the print system comprises a separate computer of the overall "computer system." An insurance policy record generated by the main processor, containing a list of the insurance policy clauses and modifiers to be printed, is transmitted to the print system, e.g., via modem or on magnetic media. The print system is coupled to a printer database 25, which contains the text of all of the insurance policy clauses and endorsement clauses. The clauses identified in the insurance policy record are retrieved from the printer database, formatted, and printed by the print system 15 to provide the final, complete policy. In such an embodiment, the libraries of insurance policy clauses 17 and endorsement clauses 21 are provided at the main processor 13 only for use in maintaining the system by adding new clauses and rule sets; they are not used in printing the final policies.

In order to create an insurance policy, a user selects one or more desired coverages from a list of coverages displayed at terminal 11. For example, in building a specialty marine insurance policy, the user may be offered, via a menu provided on terminal 11, a choice of property coverages such as Builders' Risk, Computerized Business Equipment, Contractor's Equipment, Installation, and Scheduled Property. The user will also input the name of the proposed policy holder, the policy holder's state of domicile, the effective dates of the policy, and other relevant coverage information.

In response, main processor 13 will test each insurance policy clause rule set provided in library 19 to determine which of the rule sets are satisfied by the entered coverage information. Each of the rule sets contains information identifying which insurance policy clause it corresponds to. The insurance policy clauses that correspond to the rule sets satisfied by the entered coverage information are listed by clause numbers. The endorsement rule sets are then tested to determine which are satisfied by the listed insurance policy clauses. A list of the applicable endorsements is then presented to the user, who selects the endorsements which are desired. The desired endorsements are used to replace insurance policy clauses, and a policy record containing a list of the remaining insurance policy clauses and the selected endorsements is generated for use by the print system in printing the final insurance policy.

Table 1 provides a representative sample of insurance policy rule sets.

TABLE 1

| | | | |
|---|---|---|---|
| • | • | | |
| • | • | | |
| • | • | | |
| Section A- Coverage | | | |
| 1. Covered Property | | Numbered Clause? | Bold? |
| 0001 | A+ | N | N |
| 0405 | A+ | Y | Y |
| 0353 | a+bcde! | N | N |
| 0354 | b+acde! | N | N |
| 0355 | c+abde! | N | N |
| 0356 | d+abce! | N | N |
| 0357 | e+abcd! | N | N |
| 0358 | abcde*02# | N | N |
| 0359 | a+02# | Y | N |
| 0360 | b+02#cde* | Y | N |
| 0401 | b+02#cde! | Y | N |
| 0361 | c+02#de* | Y | N |

TABLE 1-continued

| | | | |
|---|---|---|---|
| • | • | | |
| • | • | | |
| • | • | | |
| Section A- Coverage | | | |
| 1. Covered Property | | Numbered Clause? | Bold? |
| 0402 | c+02#de! | Y | N |
| 0362 | d+02#e+ | Y | N |
| 0403 | d+02#e! | Y | N |
| 0404 | e+02# | Y | N |
| 9999 | A+ | Y | N |
| 0025 | A+ | Y | Y |
| • | • | | |
| • | • | | |
| • | • | | |

Rule Key:
A = Include Always
N = Include Never
a = Scheduled Property
b = Builders' Risk
c = Contractors' Equipment
d = Computerized Business Equipment
e = Installation Floater
Format: abc+abc*abc!99#99@
Operators:
+ = must have all
* = must have one of set
! = must not have any of set
# = total number coverages selected must be >=
@ = total number coverages selected must be =
Operators apply to all characters that precede the operator, back to the previous operator or beginning of the rule. All rules must end in an operator.
Example:
ab+cd*e!03#
ab+ must have both "a" and "b"
cd* must also have either "c" or "d" or both
e! must not have "e"
03# must have at least 3 coverages selected The rule sets provided in the second column of Table 1 each comprise a string of at least one character identifying either a rule (A, N) or a coverage (a, b, c, d, e), and at least one operator (+, *, !, #, @) to be applied to the preceding character(s). Further, the rule sets are each referenced to a particular numbered clause provided in the first column of Table 1. Thus, for example, clause 0001 has the rule set A+ assigned to it. The designation A+ means that the associated clause will always be printed in every insurance policy. Thus, clauses 0001, 0405, 9999, and 0025 will be present in every insurance policy created using the rule table.

On the other hand, in order for clause 0353 to appear in an insurance policy, the user must have selected scheduled property ("a") without having selected Builders' Risk ("b"), Contractors' Equipment ("c"), Computerized Business Equipment ("d"), or the Installation Floater ("e"). This result is dictated by rule a+bcde! associated with clause 0353. If the user selected at least two types of coverage, one of them being Contractors' Equipment ("c") and one of Computerized Business Equipment ("d") or the Installation Floater ("e") as indicated by rule c+02#de*, clause 0361 will be provided in the policy.

Special note should be taken of clause 9999, which is always included in response to its rule set A+. In the illustrated embodiment, all clauses from 9000 to 9999 are null clauses. These clauses consist only of the word "NULL" followed by a hard return ("ENTER"). Null clauses serve as place holders for endorsements that may later be inserted into the policy, or as a means to reset counters. They may also be used as replacements for insurance policy clauses that are to be deleted. Null clauses are not printed into the final policy. Prior to writing a final policy to an output file, all remaining null clauses are removed. The presence of clause 9999 in the rule table portion illustrated in Table 1 indicates that it may be necessary to insert an endorsement clause immediately prior to insurance policy clause 0025. In order to provide a tentative list of the insurance policy clauses for a policy, the system of the present invention will look at each and every rule set provided in the rule table and identify, by clause number, the clauses whose rule sets are satisfied by the coverage information input by the user.

Each of the insurance policy clauses (other than null clauses) designated by the clause numbers in the first column of the rule table comprises one or more paragraphs of text which, if selected and not replaced by an endorsement clause, will be present in the final printed policy. As will be appreciated from the above discussion, only those clauses whose assigned rule sets are satisfied by the coverage information entered by a user will be retrieved for inclusion in the final policy.

Endorsement rule sets are processed in a similar manner. Table 2 illustrates a portion of an endorsement rule table.

TABLE 2

| |
|---|
| • |
| • |
| • |
| ENDORSEMENT |
| 0010 Colorado State Amendatory |
| CLS0105 CLS2164 |
| CLS9055 CLS2114 |
| CLS9069 CLS2115 |
| ENDORSEMENT |
| 0009 California State Amendatory |
| CLS0105 CLS2163 |
| CLS9055 CLS2112 |
| ENDORSEMENT |
| 0011 Connecticut State Amendatory |
| CLS0105 CLS2118 |
| CLS9055 CLS0336 |
| ENDORSEMENT |
| 0012 Florida State Amendatory |
| CLS0105 CLS2165 |
| CLS9055 CLS2119 |
| CLS0219 CLS2121 |
| CLS0124 CLS2120 |
| • |
| • |
| • |

Each endorsement rule set includes one or more substitution records that indicate which specific endorsement clauses are to replace specific insurance policy clauses. For example, endorsement rule set 0010 designates three endorsement clauses CLS2164, CLS2114, and CLS2115 that are to replace respective insurance policy clauses CLS0105, CLS9055, and CLS9069 when the Colorado State Amendatory endorsement is selected. The endorsement substitutions are read from right to left, such that the modifier clauses in the right most column of a selected endorsement will replace the corresponding insurance policy clauses in the lefthand column of the selected endorsement.

Figure 2A:
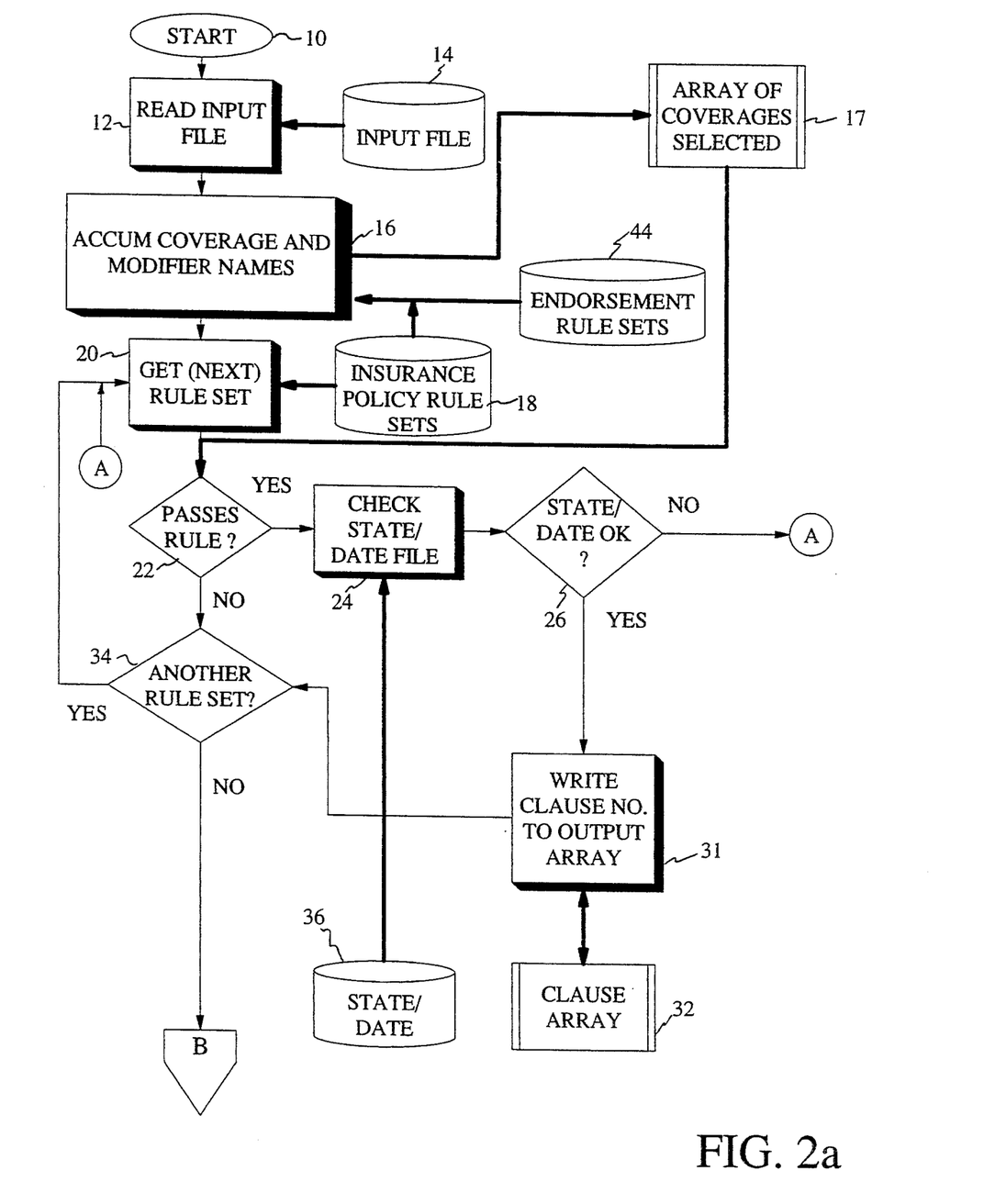
FIGS. 2a to 2c provide a high level flowchart illustrating the three main processing phases in a preferred embodiment of the present invention.
Figure 2B:
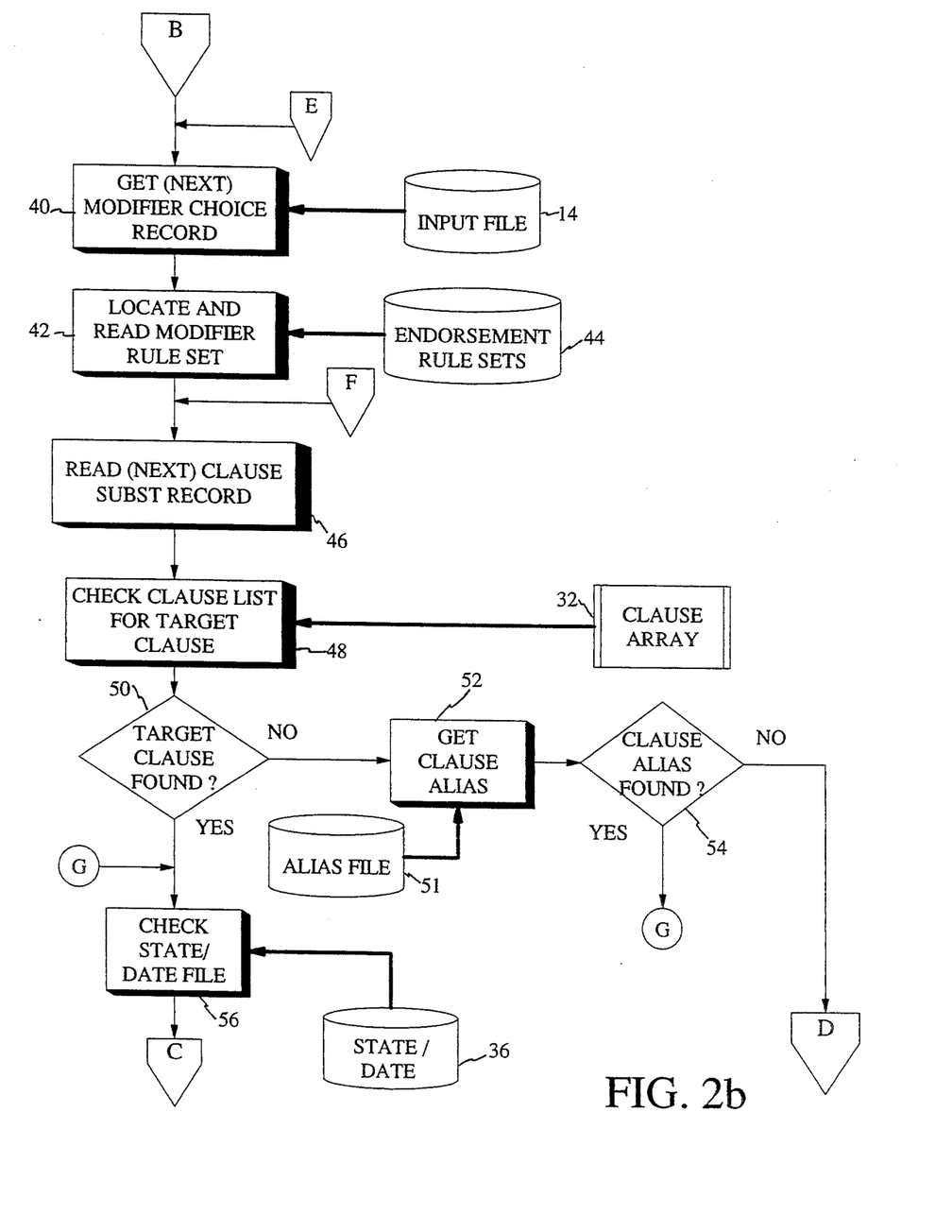
Figure 2C:
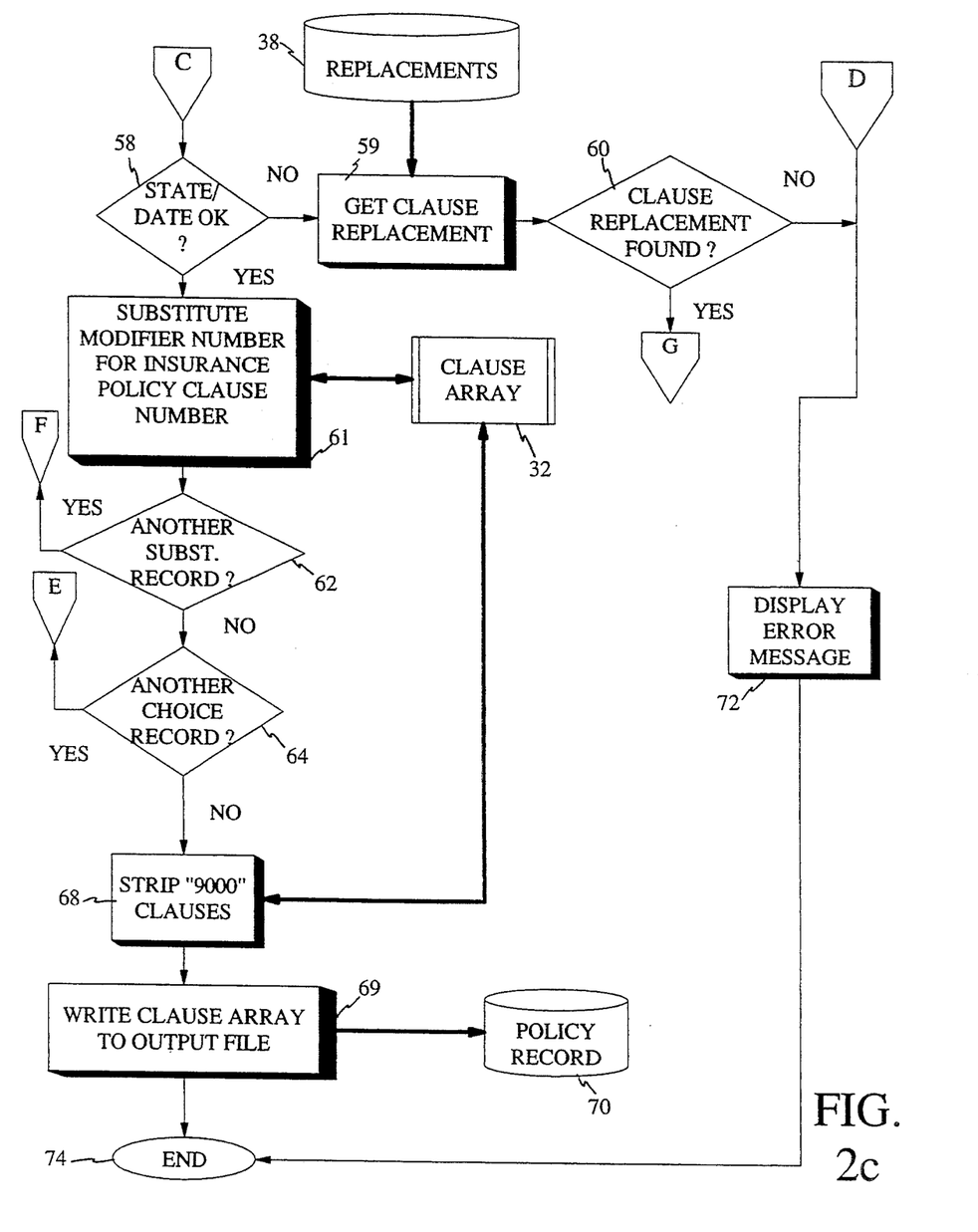

A preferred embodiment for generating an insurance policy in accordance with the present invention is illustrated in the high level flowchart of FIGS. 2a to 2c, in which the bold lines represent data flow and the regular lines represent logic flow. The process includes three phases. During Phase I, a determination is made as to which insurance policy clauses are to be included in the policy, barring any substitutions mandated by subsequently selected endorsements. A system user is provided with a list of endorsements that could apply to the insurance policy clauses chosen during Phase I. The user indicates which of the listed endorsements are desired, for subsequent processing during Phase II.

Phase II is the point at which insurance policy clauses and/or null clauses are replaced by appropriate endorsement clauses. In both Phase I and Phase II, the selected clauses (insurance policy clauses for Phase I and endorsement clauses for Phase II) are tested to determine if they meet certain requirements mandated by the state for which the policy is to be issued. If not, the system searches for an appropriate substitution clause.

In Phase III, any remaining null clauses are stripped from the output array containing the insurance policy and endorsement clauses. The remaining insurance policy and endorsement clauses are then written into an output file (referred to as the "policy record") for storage and/or printing.

The process of FIG. 2 commences at box 10. At box 12, an input file 14 containing coverage information designated by a user is read. At box 16 an initial determination is made, based on insurance policy rule sets 18, as to the insurance policy clauses that should be included in a policy having the coverages selected by the user. This preliminary determination is used to prepare a list of endorsements, based on endorsement rule sets 44, that correspond to the identified insurance policy clauses. The resultant list of endorsement (i.e., "modifier") names is presented to the user for selection of those that are to be provided in the final policy. The process performed by box 16 is described in greater detail below in connection with the flowchart of FIG. 3. The endorsements selected by the user are added to the input file 14 for later use in processing the endorsements.

After the endorsements have been selected, the insurance policy rule sets are formally processed at box 20 to tentatively select the insurance policy clauses that are required for the coverages selected by the user. At box 22, a determination is made as to whether the next insurance policy rule set (from file 18) applies to the coverages selected by the user (from selected coverages array 17). If so, a state/date file is checked at box 24 to determine whether the clause that is assigned to that particular rule set is valid for the applicable state (e.g., the state in which the proposed insured is domiciled) and whether the clause is appropriate considering the effective dates of the policy. The information as to whether a particular clause is valid for a particular state and policy term is stored in a state/date file 36. If the clause is appropriate, box 26 causes a number identifying the clause to be written into a clause array 32 as indicated at box 31. If it is determined at box 26 that the clause is not valid, the routine returns to box 20 where the next rule set is tested. Each clause that has a rule set satisfied by the selected coverages and which is valid in the applicable state will be written into the clause array via box 31.

At box 34, a determination is made as to whether all of the insurance policy rule sets have been processed. If not, the routine continues until all of the rule sets have been processed and all of the required insurance policy clauses have been tentatively determined. Once this has been accomplished, Phase I is completed and the process moves on to Phase II for the processing of endorsements.

Phase II commences at box 40 of FIG. 2b, where the first modifier selected by the user is determined by reading input file 14. At box 42, the endorsement rule set for the modifier identified at box 40 is read from the file of endorsement rule sets 44. The endorsement rule set will identify a specific endorsement clause.

As noted above, each endorsement rule set contains one or more cross-references of endorsement clauses to insurance policy clauses. Each cross-reference is referred to in the flowchart as a "clause substitution record." At box 46, the next clause substitution record of the current endorsement rule set is read, and at box 48 the list of insurance policy clauses stored in the clause array 32 is reviewed to determine if the insurance policy clause "targeted" by the endorsement clause is present. If the target insurance policy clause (to which the current endorsement clause pertains) is not found at box 50, then at box 52 insurance policy "alias clauses" are read from an alias file 51 to determine whether the targeted insurance policy clause has been replaced by an alias clause. Alias clauses are used to replace earlier obsolete clauses. The alias file is described in greater detail below, in connection with Table 3.

If no corresponding alias clause is found at box 54, an error message is displayed as indicated at box 72 (FIG. 2c). In this instance, an error has occurred because the endorsement should never have been listed for selection by the user during the preprocessing step (box 16) in the first place. Only endorsements that relate to the insurance policy clauses present (or their prior, obsolete versions) should have been presented to the user for selection. Another reason an error would be generated is where more than one endorsement is applicable to the same target clause. In this case the user will be required to resolve the conflict between the possible endorsements.

If a target clause is found at box 50 or an alias clause is found at box 54, a determination is made at boxes 56 and 58 of FIGS. 2b, 2c, respectively, as to whether the endorsement clause currently being processed is valid for the applicable state and for the policy term. The state/date file 36 is accessed to make this determination. If the clause is not valid, an attempt is made at boxes 59 and 60 to find a valid replacement for the endorsement clause, from a replacement file 38. This file contains replacement endorsement clauses that are valid in different states. Once a valid endorsement clause is located and verified, the endorsement clause is substituted for the insurance policy clause at box 61 by writing its clause number into the clause array 32 in place of the number of the corresponding insurance policy clause that was previously written into the clause array during Phase I. Then, at box 62, a determination is made as to whether another substitution record (i.e., endorsement clause/insurance policy clause cross-reference) is present in the current endorsement rule set. If so, this substitution record is processed in the same manner as above commencing at box 46.

Once all of the substitution records present in the endorsement rule set have been processed, box 64 determines whether the user has designated another endorsement for inclusion in the policy. If so, the next endorsement choice record is read at box 40, and the process continues until all of the chosen endorsements have been processed. This completes Phase II.

During Phase III, all remaining "9000" clauses (i.e., null clauses) are stripped from the clause array 32 as indicated at box 68. The resultant clause array is then written to an output file, resulting in the final policy record 70. The policy record contains, in sequential order, all of the insurance policy clauses and modifier clauses that make up the final policy. The policy record can be stored, transmitted to another computer, and/or printed as desired. The routine ends at box 74.

Figure 3:
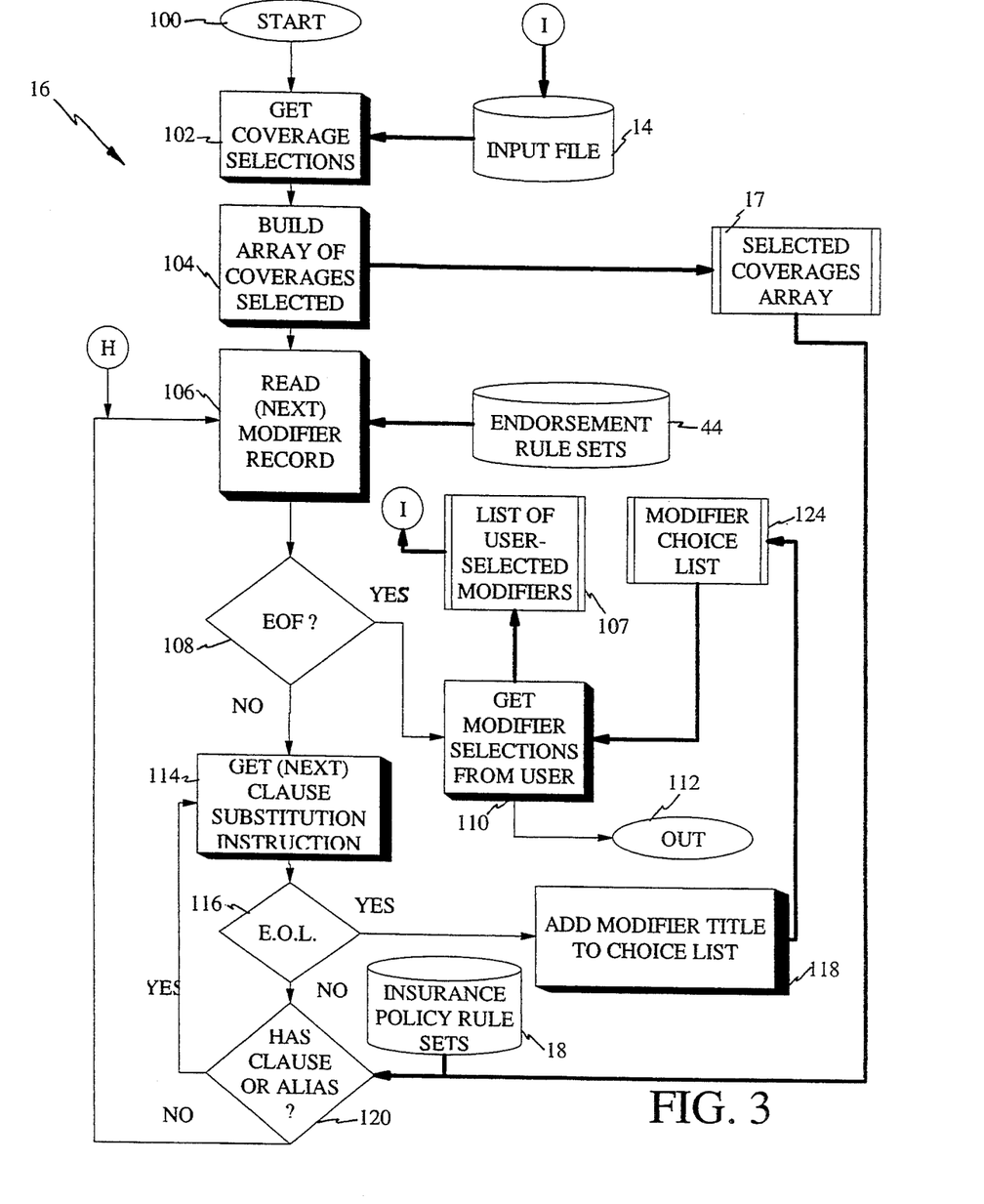
FIG. 3 is a more detailed flowchart illustrating the process by which an initial list of endorsement choices is generated in accordance with the preferred embodiment.

FIG. 3 illustrates the generation of the endorsement list (box 16) in greater detail. The routine starts at box 100, and at box 102 input file 14 is read to determine the coverages selected by the user. The user's coverage selections are converted to a data string, referred to as the "selected coverages array," at box 104. The selected coverages array is stored in a file 17.

At box 106, the first endorsement rule set ("modifier record") is read from file 44. As indicated above, each endorsement rule set will target one or more insurance policy clauses to be changed. The job of the routine illustrated in FIG. 3 is to filter out just those endorsements that apply to the core policy obtained from the coverage selections made by the user.

Box 108 ("end of file") determines whether all of the endorsement rule sets have been tested to determine if the associated endorsement applies to the core policy. If all such rule sets have not yet been tested, box 114 processes the current endorsement rule set that was read by box 106. The first target clause substitution (i.e., endorsement clause to insurance policy clause) present in the current endorsement rule set is examined at box 114. If it is determined at box 116 ("end of list") that the current endorsement rule set has not been fully processed, the current clause substitution record in the endorsement rule set is checked at box 120 to determine if the insurance policy clause that corresponds to the endorsement clause is in the core policy. This is accomplished by examining the insurance policy rule sets 18, and determining therefrom if the insurance policy clause targeted by the endorsement clause being processed relates to the selected coverages. If so, it is possible that the endorsement associated with the present endorsement rule set will be applicable to the insurance policy being built.

Before a final determination can be made as to whether the current endorsement applies to the insurance policy, each one of the clause substitution records of the endorsement rule set must be checked via boxes 114, 116 and 120. As long as each successive clause substitution record of the endorsement rule set finds that the corresponding insurance policy clause is applicable to the selected coverages, box 120 will continue to loop through the routine until the entire endorsement rule set has been processed. Assuming that all of the clause substitution records of the endorsement rule set have been satisfied, the program will flow from box 116 to box 118, where the title of the modifier currently being processed will be added to a modifier choice list 124.

Box 120 also checks to see if an alias exists for the insurance policy clause pointed to by the endorsement clause in each clause substitution record. In order to maintain a history of all insurance policy clauses ever entered into the system, an alias file is created. When an insurance policy clause becomes obsolete, it is not deleted from the system. Instead, it is replaced by a new clause, and the rule set for the obsolete clause is changed so that the obsolete clause will never be selected for inclusion in a policy. The replacement insurance policy clause can then be selected by virtue of its rule set.

Since it would be complicated to check and update all of the endorsement rule sets every time that an insurance policy clause is replaced or deleted, the alias file is created to cross-reference all of the new insurance policy clauses to the clauses that they replace. The alias file has a format as shown in Table 3.

TABLE 3

| 0314 | 1001 |
|---|---|
| 1001 | 1502 |
| 1502 | 1914 |
| • | • |
| • | • |
| • | • |

As indicated in Table 3, original insurance policy clause 0314 was replaced by clause 1001. At a later time, clause 10.01 was replaced with clause 1502. Subsequently, clause 1502 was replaced by clause 1914. In searching the alias file, an endorsement substitution record that points to target clause 0314 will not find clause 0314 in the core policy. However, it may find clause 1914 in the core policy. If this occurs, clause 1914 will be cross-referenced back to clause 1502, which in turn is cross-referenced back to clause 1001, which then refers back to clause 0314. Thus, if insurance policy clause 1914 is present in the core policy, the endorsement that modifies clause 0314 will be processed as a possible candidate for the modifier choice list.

After all of the endorsement rule sets have been processed, box 108 will detect the end of the endorsement rule set file. At this point, the modifier choice list 124 will have been completed for presentation to the user. The modifier choice list will identify all of the endorsements that can pertain to the core insurance policy clauses. The user selects desired endorsements from this list as indicated at box 110, and these selections are stored in the input file 14 as a list 107 of selected endorsements. At this point, the input file will contain the coverage information entered by the user together with the list of modifiers selected by the user. The routine is exited at box 112, at which point the Phase I processing continues at box 20 of FIG. 2a.

Figure 4:
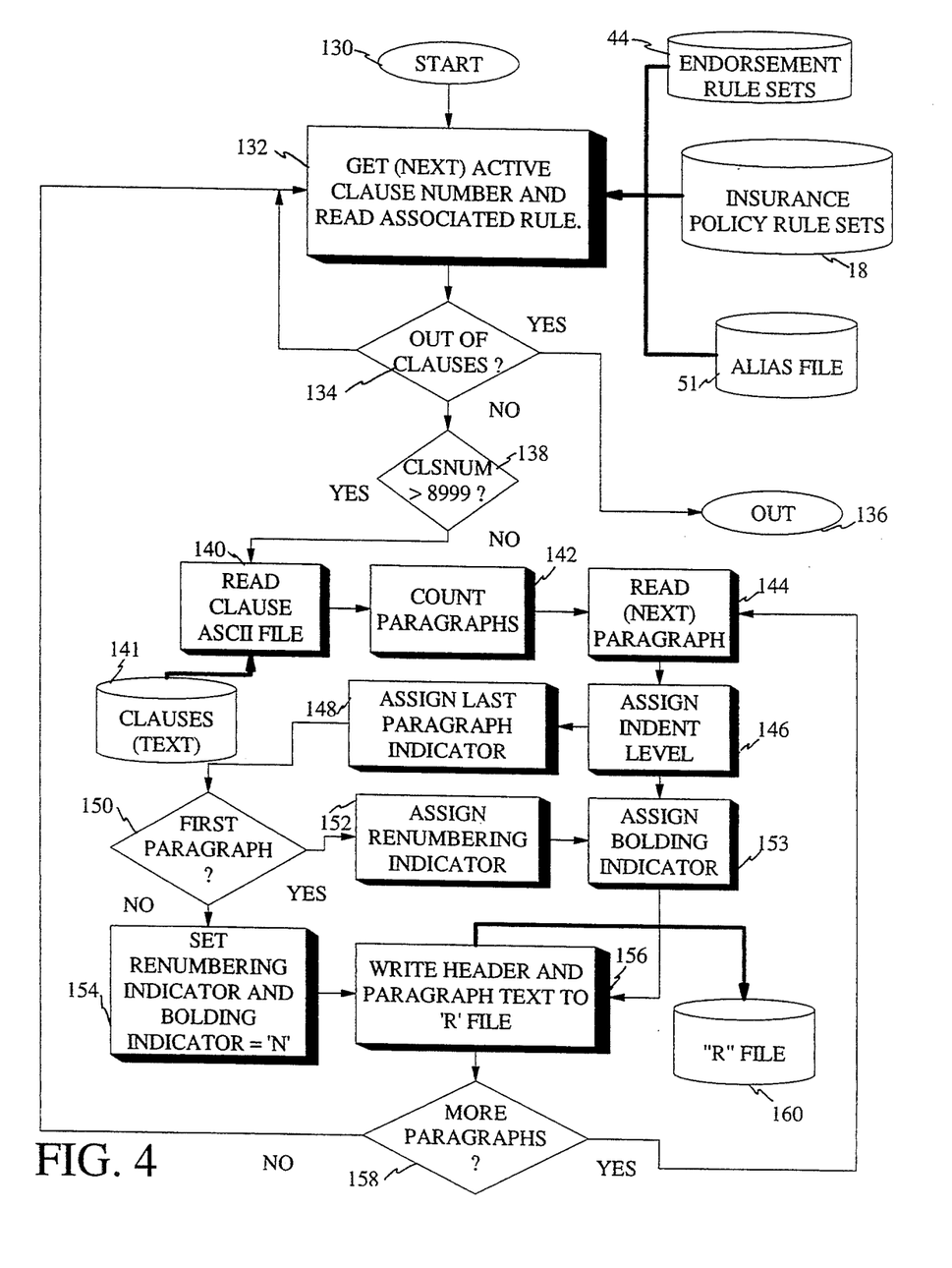
FIG. 4 is a flowchart illustrating a routine for creating headers that are used to format documents generated by the system of the present invention.

FIG. 4 is a flowchart illustrating the creation of formatting headers which are appended to the text of each clause that is to be printed in the final policy. The routine commences at box 130, and at box 132 the rule set assigned to a next clause number is read from either the endorsement rule set file 44 or the insurance policy rule set file 18, or determined using alias file 51, as appropriate. If the clause has a number greater than 8999 (i.e., the clause is a null clause) as determined at box 138, the rule is ignored and the next clause number and rule is obtained at box 132. For all clauses that are not null clauses, the clause is read as an ASCII file as indicated at boxes 140, 141. The paragraphs of the clause are counted at box 142 and at box 144 the next paragraph of the clause is read. An indentation level is assigned to the paragraph at box 146, and at box 148 a last paragraph indicator ("continue field") is assigned to the paragraph. The continue field indicates to the print system that another paragraph follows in the same clause.

At box 150, a determination is made as to whether the paragraph currently being processed is the first paragraph of the clause. If so, a renumbering indicator (i.e., a "Y" or an "N") is assigned at box 152 for placement in the header together with the indent level and continue fields. At box 153, a bolding indicator is assigned to instruct the print system to print the first line of the paragraph in bold.

At box 154, the renumbering indicator is set to "N" if the paragraph being processed is not the first paragraph of the clause. Then, at box 156 the completed header (comprising indent, bold, renumber and continue fields) is written together with its associated paragraph to a printer database file, referred to as an "R File." At box 158, a determination is made as to whether there are more paragraphs in the clause. If so, the process returns back to box 144 until all paragraphs of the current clause are processed. After the last paragraph of a clause has been processed, control passes back to box 132 for the creation of a header for the next clause. When all clauses have been processed, the routine is exited via boxes 134 and 136.

The insurance policy and endorsement clauses, together with their respective headers, are stored in the R File 160 for subsequent use by the print subsystem in providing a finished document. An example of a clause containing three paragraphs, showing the header assigned to each paragraph is provided in Table 4.

TABLE 4

| | |
|---|---|
| 2NYY | 1. "Earth Movement Limit of Insurance" means the most we will pay for "loss" in any one occurrence caused directly or indirectly by "earth movement," regardless of any other cause or event that contributes concurrently or in any sequence to the "loss." |
| 3NNY | But if "loss" by fire, explosion or "volcanic action" results from "earth movement, " we will pay up to the applicable "Basic Limit of Insurance" shown in the Declarations. We will also pay up to the applicable "Basic Limit of Insurance" shown in the Declarations for "loss" by building glass breakage resulting from volcanic eruption, explosion or effusion. |
| 3NNN | All "earth movement" that occurs within any 168-hour period will constitute a single occurrence. The expiration of this policy will not reduce the 168-hour period. |

For the clause illustrated in Table 4, the first paragraph has a header "2NYY". The numeral 2 indicates that the paragraph is to be printed with an indentation level of 2. The N indicates that the first line of the paragraph should not be bolded. The first Y indicates that the paragraph should start with a new number. The second Y indicates that there are additional paragraphs in the clause. Similarly, the header "3NNY" for the second paragraph indicates that the indent level should be 3, that there should be no bolding or renumbering and that another paragraph follows. Finally, the header "3NNN" for the third and final paragraph of the clause indicates that the indent level of this paragraph should be 3, that there should be no bolding, no renumbering, and that this is the last paragraph in the clause.

Figure 5:
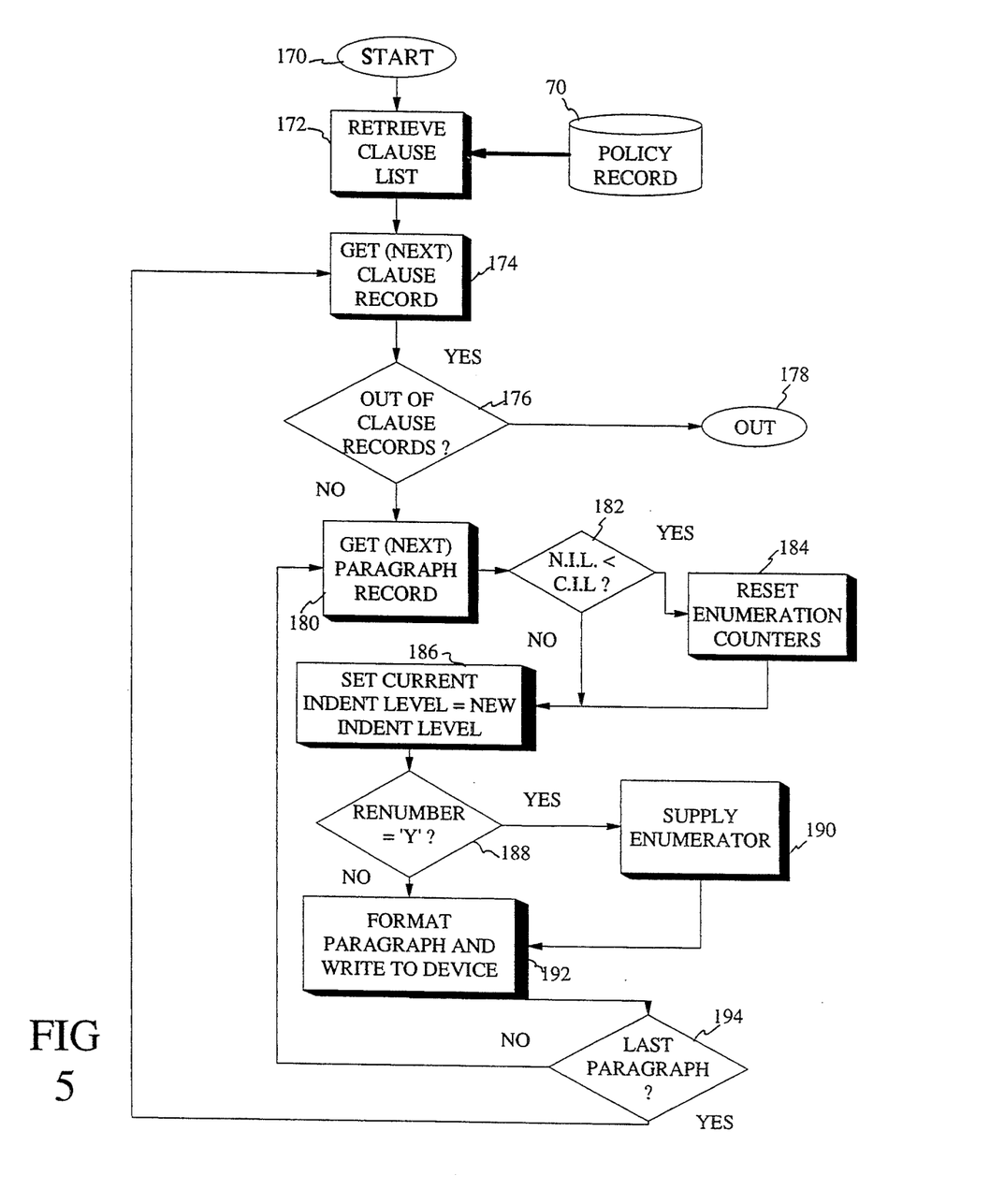
FIG. 5 is a flowchart illustrating a routine for assembling selected clauses into a final document.

FIG. 5 is a flowchart illustrating the final document creation by the print system. The print system includes the printer database (i.e., R File) provided by the header file creation routine of FIG. 4. This database includes the headers and corresponding text paragraphs for each and every clause found in the insurance policy clause and endorsement clause libraries. In order to print a new insurance policy, the print system receives the policy record 70 which is the output of the Phase III processing shown in the high level flowchart of FIG. 2c. The policy record merely contains a numerical list of all the clauses to be provided in the policy.

The document creation routine of FIG. 5 commences at box 170, and at box 172 the policy record file 70 is retrieved. Each clause number contained in the policy record file is processed one at a time, as indicated at box 174. An end-of-file determination is made at box 176 to determine if all of the clauses in the policy record have been processed. If they have, the routine is exited at box 178. Otherwise, the next paragraph record of the clause is obtained at box 180, and a determination is made at box 182 as to whether the indent level for this paragraph (NIL) is less than the current indent level (CIL). If it is, an enumeration counter associated with the indent level (if any) and all greater indent levels is reset at box 184. The current indent level is then set equal to the new indent level at box 186. If box 188 determines that the paragraph is one to be renumbered (by virtue of a Y in the renumber field of the paragraph's header), the proper enumerator (i.e., number or letter) is provided as indicated at box 190. The paragraph is then written to an output file, computer screen, or printer with a proper indent level and any associated enumerator, as indicated at box 192. If the first line of the paragraph is to be bolded, this information is also provided to the output file, screen or printer.

After the paragraph just processed has been written to the output file, screen or printer, a determination is made at box 194 as to whether this is the last paragraph of the clause being processed. If not, the routine returns to box 180 for processing of the next paragraph record. When all paragraphs of a clause have been processed, the routine loops back to box 174 for processing of the next clause in the same manner. After all clauses for the insurance policy have been processed, the document creation is complete and the routine is exited via boxes 176 and 178.

It should now be appreciated that the present invention provides a powerful rule based document generation system. A document is assembled from a plurality of clauses, each clause having a rule set assigned thereto. The rule sets are tested against document parameters entered by a user. If a rule set indicates that its associated clause is to be provided in a document based on the document parameters, the number of the clause is added to an output array. A document print system maintains a printer database containing the text of all of the clauses together with header information for each clause. By supplying the output array of clause numbers to the printer system, the full document can be assembled with appropriate paragraph numbering and indentation levels as dictated by the header information.

In an illustrated embodiment, the document generation system is used to provide customized insurance policy documents. Standard insurance policy clauses are modified by replacing them with endorsements. A list of applicable endorsements is generated by testing rule sets associated with each of the endorsements. The endorsement rule sets refer back to insurance policy clauses. If all of the insurance policy clauses required by an endorsement are present in a core policy (as determined on the basis of rule sets associated with the insurance policy clauses), the endorsement is added to an endorsement selection list. A user then selects those endorsements which are desired for the customized insurance policy. The selected endorsements replace insurance policy clauses in the core policy.

Although the invention has been described in connection with a preferred embodiment thereof, those skilled in the art will appreciate that numerous adaptations and modifications may be made thereto, without departing from the spirit and scope of the invention as set forth in the claims.

We claim:

1. A rule based document generation system for constructing insurance policies in response to coverage information input thereto, comprising:
a computer processor;
first memory means coupled to said processor, said first memory means storing a library of rule sets each corresponding to a different insurance policy clause and designating a set of parameters that must be satisfied in order for its corresponding insurance policy clause to be included in an insurance policy;
a user interface coupled to said processor for enabling a user to enter coverage information identifying a set of different coverages to be provided in an insurance policy;
said processor being adapted to compare the parameters designated by the rule sets for the insurance policy clauses to the set of different coverages identified by said coverage information, to provide a list of those rule sets having parameters that are all satisfied by said coverage information;
means for identifying superseded insurance policy rule sets referred to on said list and replacing the superseded insurance policy rule sets referred to on said list with references to superseding endorsement rule sets each corresponding to a different endorsement clause; and
means for assembling the insurance policy and endorsement clauses corresponding to the rule sets referred to on said list into said insurance policy.

2. A document generation system in accordance with claim 1 wherein said rule sets each comprise a string of at least one character identifying either a rule or a coverage and at least one operator to be applied to the character.

3. A document generation system in accordance with claim 1 comprising second memory means for storing said insurance policy clauses, wherein said assembling means comprise a print system for retrieving the insurance policy clauses set forth on said list from said second memory means and formatting them for printing.

4. A document generation system in accordance with claim 1 wherein said identifying and replacing means comprise:
second memory means coupled to said processor, said second memory means storing a library of rule sets each corresponding to a different endorsement and designating at least one insurance policy clause that is superseded by that endorsement;
said processor being adapted to compare the insurance policy clauses designated by the endorsement rule sets to the insurance policy clauses corresponding to the insurance policy rule sets referred to on said list, and to replace references to the superseded insurance policy rule sets on said list with references to superseding endorsement rule sets.

5. A document generation system in accordance with claim 1 wherein prior to adding an insurance policy rule set to said list, said processor tests the validity thereof against criteria established by said coverage information to preclude invalid rule sets from appearing on the list.

6. A document generation system in accordance with claim 5 further comprising:
an alias file for cross referencing obsolete insurance policy clauses to replacement clauses therefor;
wherein said processor:
(i) examines said alias file to identify any endorsements whose rule sets are satisfied by the obsolete insurance policy clauses that were replaced by replacement clauses whose rule sets are contained on said list, and
(ii) replaces the rule sets for such replacement clauses on said list with superseding endorsement rule sets.

7. A document generation system in accordance with claim 6 comprising third memory means for storing said insurance policy clauses and fourth memory means for storing said endorsement clauses, wherein said assembling means comprise a print system for retrieving the insurance policy and endorsement clauses set forth on said list from said third and fourth memory means, respectively, and formatting them for printing.

8. A document generation system in accordance with claim 7 wherein said retrieved clauses are formatted in response to header information appended to the retrieved clauses.

9. A document generation system in accordance with claim 8 wherein:
a library of said insurance policy clauses includes null clauses having associated rule sets; and
said list also lists null clauses that have rule sets satisfied by said entered coverage information.

10. A document generation system in accordance with claim 9 wherein:
said user interface, said computer processor and said first and second memory means comprise a first computer for providing said list of clauses and endorsements; and
said print system comprises a second computer coupled to said third and fourth memory means for retrieving and formatting said clauses.

11. A document generation system in accordance with claim 1 further comprising:
an alias file for cross referencing obsolete insurance policy clauses to replacement clauses therefor;
wherein said processor:
(i) examines said alias file to identify any endorsements whose rule sets are satisfied by the obsolete insurance policy clauses that were replaced by replacement clauses whose rule sets are contained on said list, and
(ii) replaces the rule sets for such replacement clauses on said list with superseding endorsement rule sets.

12. A document generation system in accordance with claim 4 comprising third memory means for storing said insurance policy clauses and fourth memory means for storing said endorsement clauses, wherein said assembling means comprise a print system for retrieving the insurance policy and endorsement clauses set forth on said list from said third and fourth memory means, respectively, and formatting them for printing.

13. A document generation system in accordance with claim 12 wherein said retrieved clauses are formatted in response to header information appended to the retrieved clauses.

14. A document generation system in accordance with claim 1 wherein:
a library of said insurance policy clauses includes null clauses having associated rule sets; and
said list also lists null clauses that have rule sets satisfied by said entered coverage information.

15. A document generation system in accordance with claim 12 wherein:

said user interface, said computer processor and said first and second memory means comprise a first computer for providing said list of clauses and endorsements; and said print system comprises a second computer coupled to said second and third memory means for retrieving and formatting said clauses.

16. A method for automatically generating documents by assembling a plurality of clauses selected from a library of clauses stored in a computer system, comprising the steps of:

inputting said library of clauses into said computer system;

assigning a rule set to each of said clauses, each rule set providing at least one rule that must be satisfied in order to include the clause associated therewith in a document;

inputting said rule sets into said computer system;

modifying the rule set for a clause when that clause has become obsolete to prevent the use of the obsolete clause in said document;

inputting a replacement clause to said computer system for the obsolete clause;

providing a rule set for said replacement clause;

inputting a set of document parameters into said computer system defining subject matter to be contained in said document; testing each rule set in said computer system to identify those that are satisfied by said document parameters;

retrieving the clauses to which the identified rule sets are assigned; and assembling the retrieved clauses into said document.

17. A method in accordance with claim 16 wherein a history of obsolete clauses is maintained in said computer system by the step of:

providing an alias file that cross references the obsolete clauses to corresponding replacement clauses.

18. A method for automatically generating insurance policy documents by assembling a plurality of clauses selected from a library of clauses stored in a computer system, comprising the steps of:

inputting a library of insurance policy clauses into said computer system;

inputting a library of endorsements into said computer system;

assigning a rule set to each of said insurance policy clauses, each rule set providing at least one rule that must be satisfied in order to include the clause associated therewith in a document;

inputting said rule sets into said computer system;

inputting a set of document parameters into said computer system defining subject matter to be contained in said document;

testing each rule set in said computer system to identify those that are satisfied by said document parameters;

after the clauses satisfied by said document parameters have been identified, detecting which of the endorsements can be used to modify the identified clauses;

selecting endorsements that are desired for said insurance policy from the detected endorsements;

retrieving the insurance policy clauses to which the identified rule sets are assigned;

retrieving the endorsements selected during said selecting step instead of retrieving corresponding insurance policy clauses that are modified thereby; and assembling the retrieved endorsements together with the retrieved insurance policy clauses into said insurance policy.

19. A method in accordance with claim 18 comprising the further steps of:

testing the insurance policy clauses to which the identified rule sets are assigned to determine whether the clause is valid for use in said insurance policy; and retrieving only insurance policy clauses that are valid for use in said insurance policy.

20. A method in accordance with claim 18 wherein obsolete clauses are updated with replacement clauses, comprising the further steps of:

assigning a new rule set to each obsolete clause to prevent the identification of the obsolete clause during said testing step;

inputting a replacement clause to said computer system for each obsolete clause that is to be replaced;

providing a rule set for each replacement clause;

providing an alias file that cross references the obsolete clauses to corresponding replacement clauses; and examining said alias file during said endorsement detecting step to detect endorsements that can be used to modify replacement clauses by cross reference to said obsolete clauses.

* * * * *